(12) United States Patent
Chapple et al.

(10) Patent No.: US 8,887,054 B2
(45) Date of Patent: Nov. 11, 2014

(54) APPLICATION SELECTION USER INTERFACE

(75) Inventors: Loren D. Chapple, Vancouver, WA (US); Venugopal Kumarahalli Srinivasmurthy, Bangalore (IN); Deepak Ramachandran, Bangalore (IN); Hitesh Amrutial Bosamiya, Bangalore (IN); Jacob Refstrup, Vancouver, WA (US); Scott Femling, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1031 days.

(21) Appl. No.: 12/760,695

(22) Filed: Apr. 15, 2010

(65) Prior Publication Data

US 2011/0258549 A1   Oct. 20, 2011

(51) Int. Cl.
G06F 3/048      (2013.01)
G06F 3/0482     (2013.01)

(52) U.S. Cl.
CPC .................................. *G06F 3/0482* (2013.01)
USPC ........................................ 715/733; 715/734

(58) Field of Classification Search
CPC ...................................................... G06F 3/048
USPC ................................................. 715/733, 734
See application file for complete search history.

(56) References Cited

U.S. PATENT DOCUMENTS

| 6,529,214 | B1 | 3/2003 | Chase et al. |
| 6,940,614 | B2 | 9/2005 | Subramaniam |
| 7,046,384 | B2 | 5/2006 | Ferlitsch et al. |
| 7,408,667 | B2 | 8/2008 | Ferlitsch |
| 7,409,434 | B2 | 8/2008 | Lamming et al. |
| 7,424,459 | B2 | 9/2008 | Bodmer et al. |
| 7,538,899 | B2 | 5/2009 | Kawaoka |
| 7,634,541 | B2 | 12/2009 | Chen et al. |
| 7,779,108 | B2 | 8/2010 | Kawai |
| 7,797,349 | B2 | 9/2010 | Kosaka |
| 7,924,452 | B2 | 4/2011 | Matsuda |
| 8,095,376 | B2 | 1/2012 | Gombert et al. |
| 8,239,239 | B1 | 8/2012 | Malhotra et al. |
| 2002/0120742 | A1 | 8/2002 | Cherry |

(Continued)

FOREIGN PATENT DOCUMENTS

JP   2003108345 A   4/2003
JP   2007328639 A   12/2007

OTHER PUBLICATIONS

DifferenceBetween.net, "Difference Between Google and iGoogle," Oct. 21, 2009, (web page), <http://web.archive.org/web/20091021203910/http://www.differencebetween.net/technology/internet/difference-between-google-and-igoogle/>.

(Continued)

*Primary Examiner* — Andrea Leggett
(74) *Attorney, Agent, or Firm* — Jack McKinney

(57) ABSTRACT

An apparatus includes a builder, a template engine, and an assembler. The template engine is operable to identify a reference template associated with application selection. The assembler is configured to assemble a request from the identified reference template and state data indicated by the reference template. The builder is configured to process a user interface description retrieved using the request to cause the display of a user interface having one or more objects each associated with an application available from a network service, the applications having been selected according to the state data.

17 Claims, 6 Drawing Sheets

(56) References Cited

U.S. PATENT DOCUMENTS

| | | |
|---|---|---|
| 2002/0191210 A1 | 12/2002 | Staas et al. |
| 2002/0191211 A1 | 12/2002 | Miller et al. |
| 2003/0084449 A1 | 5/2003 | Chane et al. |
| 2003/0115548 A1 | 6/2003 | Melgar |
| 2003/0172141 A1 | 9/2003 | Miller et al. |
| 2004/0085366 A1 | 5/2004 | Hinegardner et al. |
| 2004/0227960 A1 | 11/2004 | Farros et al. |
| 2004/0230447 A1 | 11/2004 | Schwerin-Wenzel et al. |
| 2005/0083548 A1 | 4/2005 | Suga et al. |
| 2005/0132094 A1 | 6/2005 | Wu |
| 2006/0085781 A1 | 4/2006 | Rapp et al. |
| 2007/0050750 A1 | 3/2007 | Bykov et al. |
| 2007/0198656 A1* | 8/2007 | Mazzaferri et al. ........... 709/218 |
| 2008/0037062 A1 | 2/2008 | Omino et al. |
| 2008/0082923 A1 | 4/2008 | Ferlitsch |
| 2008/0137133 A1 | 6/2008 | Trappe |
| 2008/0270597 A1 | 10/2008 | Tenenti |
| 2009/0063718 A1 | 3/2009 | Sekine et al. |
| 2009/0190150 A1* | 7/2009 | Selvaraj et al. .............. 358/1.13 |
| 2009/0217188 A1 | 8/2009 | Alexander et al. |
| 2009/0326684 A1 | 12/2009 | Wang et al. |
| 2010/0079804 A1 | 4/2010 | Otsuka |
| 2011/0026071 A1 | 2/2011 | Xiao et al. |
| 2011/0032562 A1 | 2/2011 | McCuen et al. |
| 2011/0041052 A1 | 2/2011 | Fraisl |
| 2011/0188063 A1 | 8/2011 | Nuggehalli et al. |
| 2011/0255123 A1 | 10/2011 | Refstrup et al. |
| 2011/0267633 A1 | 11/2011 | Srinivasmurthy et al. |
| 2011/0276945 A1 | 11/2011 | Chasman et al. |

OTHER PUBLICATIONS

Wikipedia, "iGoogle," (web page), Nov. 20, 2009, <http://web.archive.org/web/20091120065654/http://en.wikipedia.org/wiki/IGoogle>.

Wikipedia, "Yahoo!," (web page), Aug. 30, 2009, <http://web.archive.org/web/20090830065732/http://en.wikipedia.org/wiki/Yahoo!>.

* cited by examiner

APPLICATION SELECTION USER INTERFACE

BACKGROUND

Peripheral devices such as printers can be configured to communicate directly with the internet. Thus, functions that would otherwise be provided by processing components of the device can now be provided by a network service. Various functions can be segregated into applications. A user interface containing icons or other representations of the applications is displayed by the device to a user. Through this user interface, the user is able to select and interact with a given application. Placing the responsibility of generating this user interface on the peripheral device proves problematic. The particular applications made available and the order of their presentation is fixed in the device's firmware. Thus, as new applications are developed, the device relies on firmware updates to access the applications. Further, different firmware updates would be needed for devices having different capabilities.

DRAWINGS

Figure 8:
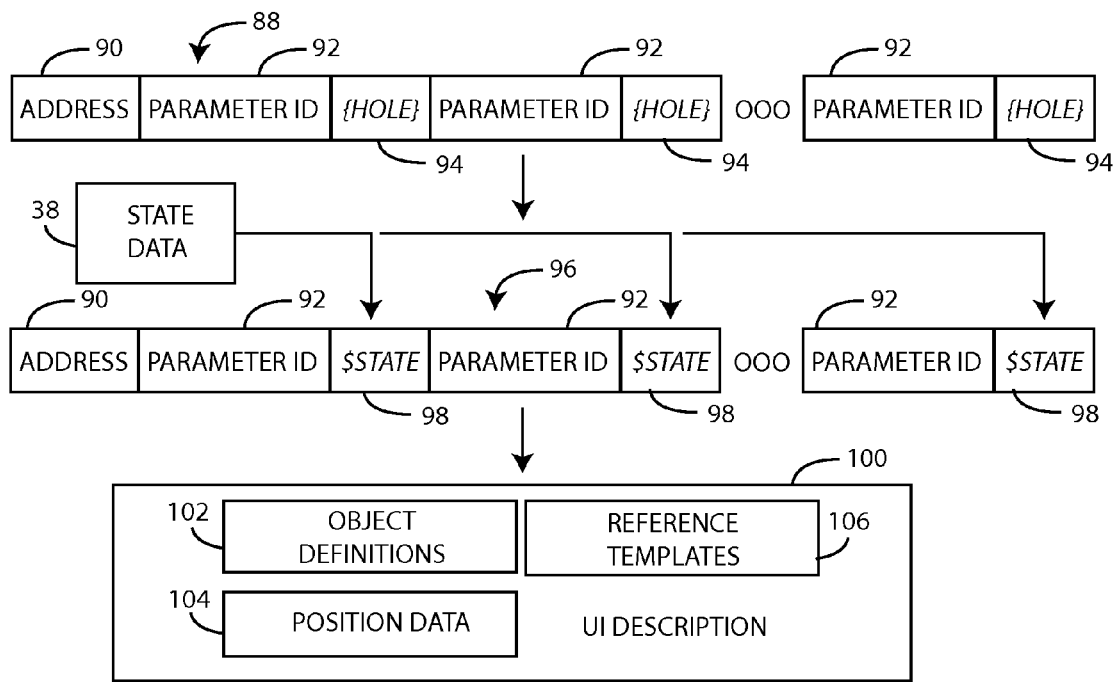
Figure 8:
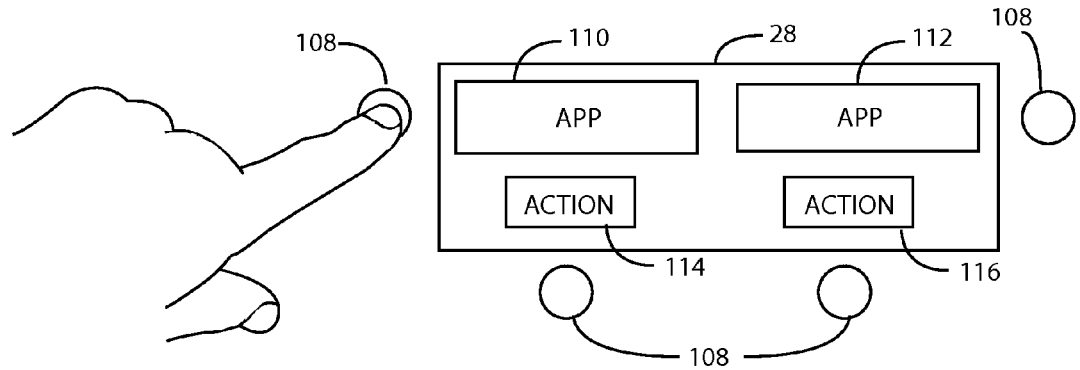
Figure 8:
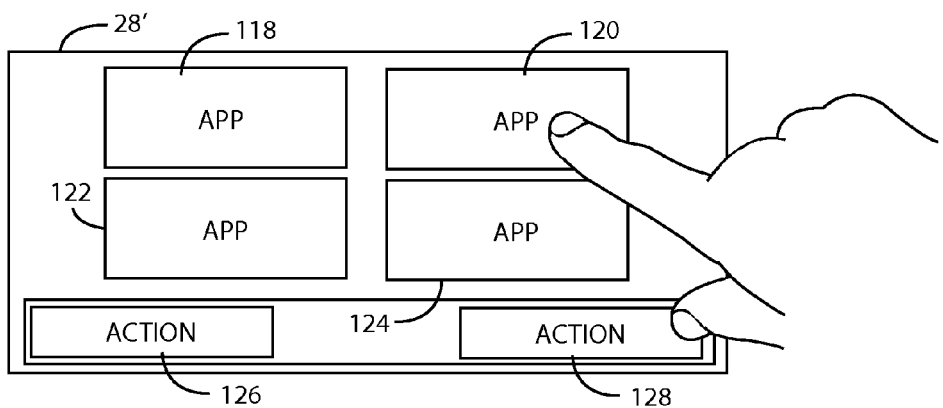

FIG. 8 graphically depicts an exemplary use of reference templates to communicate device state data according to and embodiment.

DETAILED DESCRIPTION

Introduction

Various embodiments described below were developed in an effort to provide a fleet of disparate devices with user interfaces for accessing applications supplied by a network service. In particular, the user interface provided to a given device allows interaction with applications determined to be compatible with that device. Further the user interface can be adapted to user identified preferences as well as business and application policies. For example a user may prefer that a given application always be accessible. An application policy may specify that a particular application be available only in a particular geographic region. A business policy might promote a new application such that the user interface icon used to represent that application is highlighted.

A "network service" refers to a server or collection of servers that are configured to communicate with a collection of devices to fulfill intended functions. Where those devices are printers, for example, those functions can include generating and delivering print jobs to the devices. Those functions can also include, as described in more detail below, projecting user interfaces to be displayed by those devices allowing users to interact with the network service.

"State data" refers to information corresponding to the state of a device that can be used by a network service to fulfill a given function. State data can identify capabilities of the device, a user's configuration of the device, and a current navigation state of a user's interaction. For example, where the device is a printer with a touch screen display, state data can identify the existence and the dimensions of the display, whether or not the printer can produce color output, consumable levels, and the availability of a particular print media such as photo paper. State data can identify a preferred language and other regional settings. State data can also define a position within a current workflow such as a currently photo selected from a series of photos.

A "user interface" as used herein is a visual display through which a user can select from among one or more objects. An object, for example, can be a user selectable icon or a control button that is associated with the selection of an application or a particular function to be performed by a selected application. A "user interface description" is an electronic file that when processed causes the display of a particular user interface. The file, for example, may follow the XML (Extensible Markup Language) format. The file defines the objects and their placement. The file also associates a reference template with each object. A reference template is a reference such as an URL (Uniform Resource Locator) configured to be populated with state data identified or otherwise indicated by the reference template. The reference template defines a function associated with a given object. In other words, upon selection of an object, an associated reference template is populated with corresponding state data and used to make a call to a network service.

The term "job" is used to refer to data that can be processed by a device to produce a desired result or output. Where the device is a printer, a job may cause the device to produce printed output. However, the output need not be physical. For example, the output may be the display of a video or the archiving or transmission of an electronic file.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Environment

Figure 1:
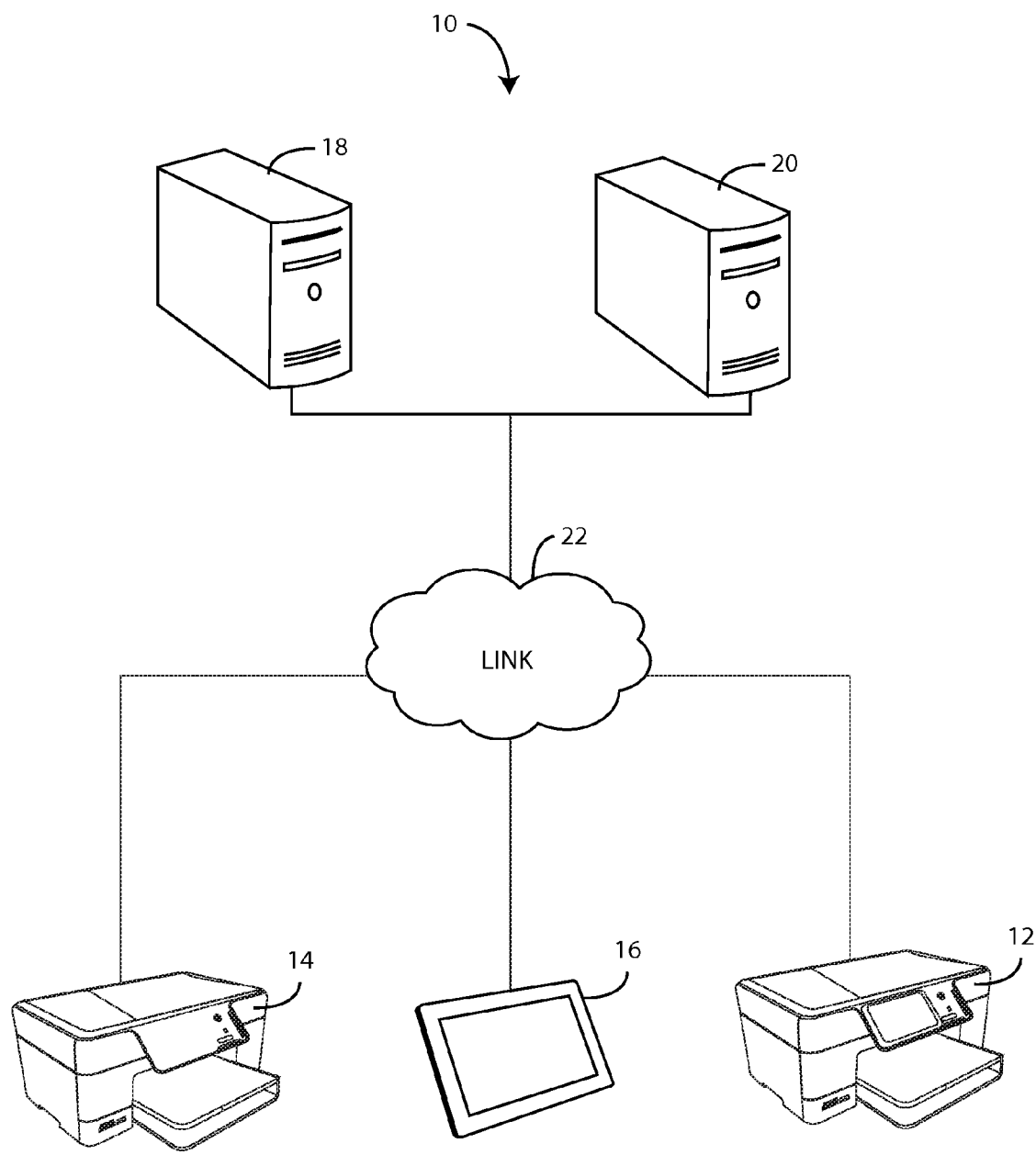
FIG. 1 depicts an exemplary environment in which various embodiments may be implemented.

FIG. 1 depicts an exemplary network 10 in which various embodiments may be implemented. Network 10 is shown to include devices 12, 14, and 16, job service 18, and application service 20. Devices 12-16 represent generally any electronic devices capable of communicating with one or both of application service 18 and job service 20 to request the performance of specified functions. Such functions can include the generation and delivery of jobs. In the example of FIG. 1, device 12 and 14 are printers capable of processing print jobs received from job service 18. Device 12 includes an integrated display, while device 14 does not. Device 16 is a display device that can serve as a display for device 14. Devices 12 and 14, however, need not be printers. Devices 12 and 14 may be of another device type capable of processing job to produce an output. That output may, but need not, be physical. For example, the output may be the display of a video or the archiving or transmission of an electronic file.

Job service 20 represents a network service configured to communicate jobs to devices 12 and 14. Application service 18 represents a network service configured to communicate with devices 12-16 to perform specified functions such as causing job service 20 to deliver a particular job. Where devices 12 and 14 are printers, those functions can include causing job service 20 to deliver print jobs to devices 12 and 14. The functions can also include projecting user interfaces to be displayed by devices 12 and 16. Projecting a user interface, as discussed below, involves communicating a description of the user interface to a device 12 or 16. The device 12 or 16 then processes that description to display the user interface. Through interactions with the user interface, a user can select an object or icon that represents a particular function to be performed. Where that function is to be performed by application service 20 (rather than device 12, 14, or 16), the device 12 or 16 informs application service 20 of the user's selection. Application service 20 then performs the specified function.

Components 12-20 are interconnected via link 22. Link 22 represents generally one or more of a cable, wireless, fiber optic, or remote connections via a telecommunication link, an infrared link, a radio frequency link, or any other connectors or systems that provide electronic communication. Link 22 may include, at least in part, an intranet, the Internet, or a combination of both. Link 22 may also include intermediate proxies, routers, switches, load balancers, and the like. The paths followed by link 22 between components 12-20 as depicted in FIG. 1 represent the logical communication paths between these devices, not necessarily the physical paths between the devices.

Components

Figure 2:
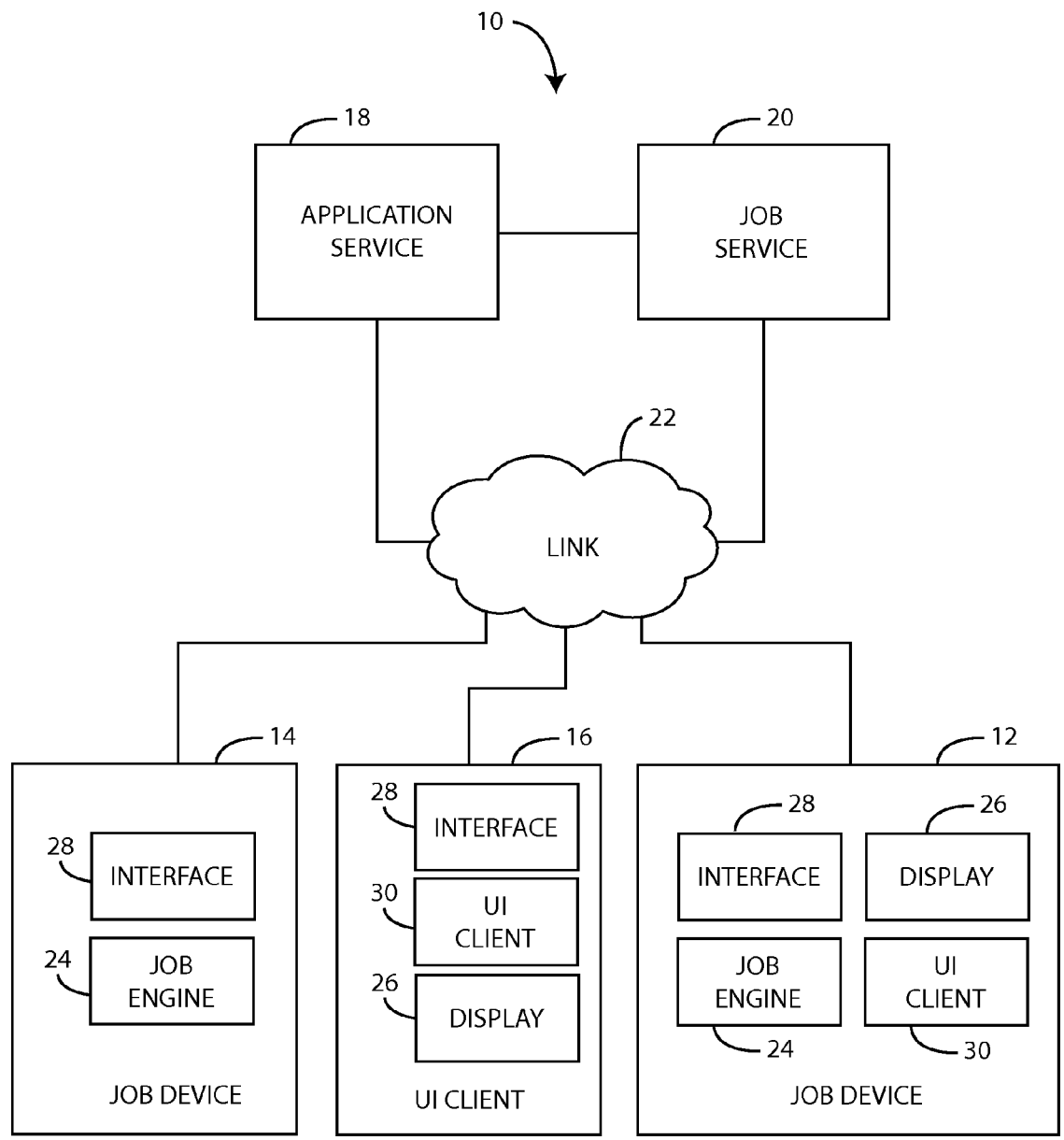
FIGS. 2-4 depict examples of various physical and logical components for implementing various embodiments.
Figure 3:
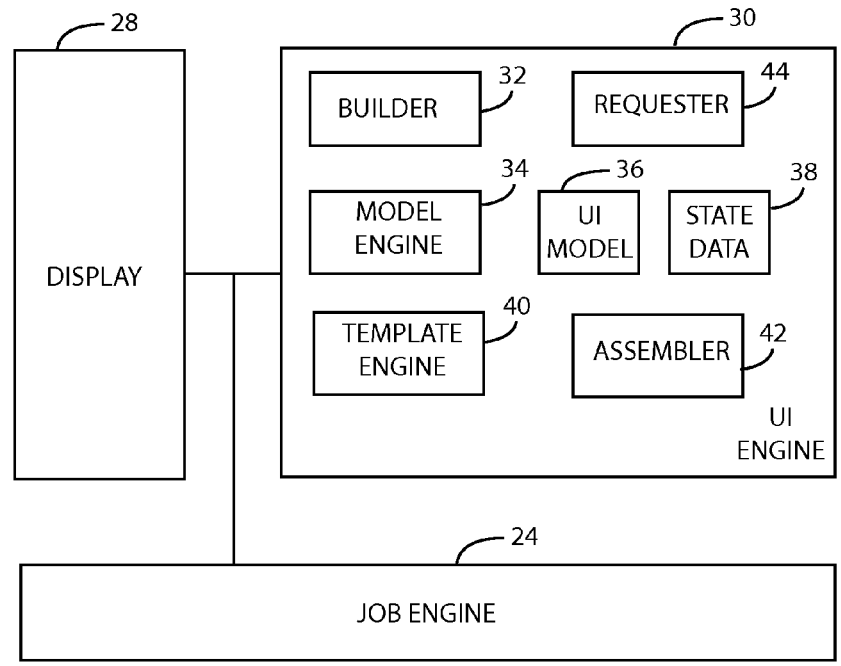
Figure 4:
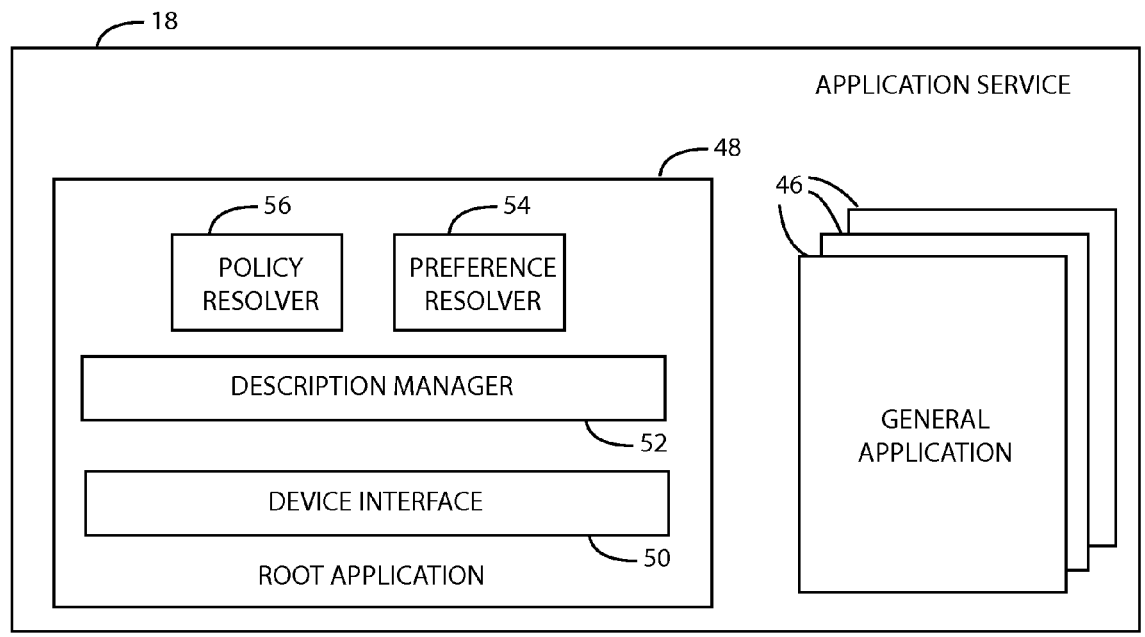

FIGS. 2-4 depict various physical and logical components for implementing various exemplary embodiments. In FIG. 2, device 12 is shown to include job engine 24, interface 26, display 28, and UI (User Interface) client 30. Device 14 is shown to include job engine 24 and interface 28, while device 16 is shown to include display 26, interface 28 and UI client 30. Job engine 24 represents generally any combination of hardware and programming configured to process a job received from job service 20 to achieve an intended result. For example, where device 12 or 14 is a printer and the job is a print job, job engine 28 is responsible for processing the print job to produce printed output. In this example, job engine 28 would include components to deposit imaging material such as ink or toner onto a media sheet.

Display 26 represents generally any display screen on which a user interface can be displayed. Display 26 may be a touch screen allowing a user to select a user interface object by touching a particular screen location. Display may not include touch capabilities, but instead have associated physical buttons that when depressed or otherwise activated correspond to the selection of user interface objects. In one example, a user interface object may be positioned adjacent to such a button. In another example, one button may be used to highlight a user interface object while another may be used to select a highlighted object.

Interface 28 represents generally any combination of hardware and programming configured to receive communications from and pass communications to application service 18 and job service 20 via link 22. In particular, interface 28 may include one or more physical ports such as a wired or wireless network port via which communications may be sent and received on more than one data channel.

UI client 30 represents generally any combination of hardware and programming configured to process a user interface description to cause the display of a user interface on display 28. UI client 30 is also responsible for detecting the selection of a user interface object, populating a reference template with state data indicated by the template to assemble a request, and communicating that request to application service 18 using interface 26

Moving to FIG. 3, UI client 30 is shown to include builder 32, model engine 34, UI model 36, state data 38, template engine 40, assembler 42 and requester 44. Builder 32 represents generally any combination of hardware and programming configured to process a user interface description to cause the display of a user interface on display 26. As described, a user interface description defines one or more objects and the positioning of each object. The position may be a pixel coordinate or coordinates of a display. Where objects are members of a list, the position may be a relative position of that object in the list. Thus, a user interface description may define objects in a particular order, and builder 32 may infer the position of an object based on its relative position within that order.

Model engine 34 represents generally any combination of hardware and programming configured to create UI model 36 for a current user interface description. As described above, a user interface description also defines reference templates each associated with a different object defined by that model. Each reference template identifies or otherwise indicates state data that, if available, is obtained from state data 38. UI model 36 is data associating those reference templates with objects displayed in a current user interface presented on display 28.

Template engine 40 represents generally any combination of hardware and programming configured to identify a reference template for use in assembling a request. Template engine 40 may be called upon to identify reference template upon device initialization or upon a user's indication of a desire to access applications provided by application service 18 (FIG. 2). Template engine 40 may locate this initial reference template from device memory, or it may send a request and retrieve the initial reference template from application service 18. Template engine 18 identifies subsequent reference templates after detecting a user's selection of an object of a user interface presented on display 26. Upon detection, template engine 40 examines UI model 36 to identify a reference template associated with the selected object.

Assembler 42 represents generally any combination of hardware and programming configured to assemble a request from an identified reference template and state data indicated by the reference template. In particular assembler 42 may examine a reference template selected by template engine 40 and populate the identified reference template with corresponding state data obtained from state date 38. Requester 44 represents generally any combination of hardware and programming configured to communicate a request assembled by assembler 42 to application service.

A reference template, for example, may include a network address for accessing a network service. Appended to the template may be parameter IDs that identify particular pieces of state data. The following is an example http://app.hp.com/app/appname/type/cards/$lang/{$lang}/category/{category}/$touch/{$touch}. The portion "app.hp.com/app/appname/type/cards" is an address for accessing a network service. Portions "$lang", "category", and "$touch" are parameter IDs, while "{$lang}", "{category}", and "{$touch}" are holes or placeholders into which state data can be inserted. An assembled request could then be:"http://app.hp.com/app/appname/type/cards/$lang/en/category/birthday/$touch/false." State data "en" has been inserted to indicate English as a user preferred or regional language. "Birthday" has been inserted to indicate a category or navigation state within a workflow. "False" has been entered to specify that the device does not have touch screen device capabilities.

Referring now to FIG. 4, application service 18 is shown to include general applications 46 and root application 48. Each general application 46 represents generally a combination of programming and hardware configured to perform a function at the request of device 12 or 15. Where devices 12 and 14 are printers, such function may include causing a print job to be delivered from job service 20. Root application 48 represents generally any combination of hardware and programming configured to acquire and communicate an initial user interface description to devices 12 and 16. An initial user interface description is a user interface description that when processed causes a display of objects for selecting from among general applications 46.

In the example of FIG. 4, root application 48 includes device interface 50, description manager 52, preference resolver 54, and policy resolver 56. Device interface 50 represents generally any combination of hardware and programming configured to cause devices 12 and 16 to process a user interface description to cause the display of a user interface for selecting from among general applications 46. Such may be accomplished by communicating a user interface description to device 12 or 16 where it is processed following receipt. Device interface 50 is also responsible for receiving a request assembled by a device 12 or 16. The request is assembled from a reference template and state data indicated by the reference template.

Description manager 52 represents generally any combination of hardware and programming configured to identify those of general application 46 that are compatible with the state data. Description manager 52 is also responsible for acquiring a user interface description defining a plurality of objects and a plurality of reference templates. Each reference template is associated with a different one of the objects, and each object is associated with a different one of the general applications identified as compatible. To acquire a user interface description, description manager 52 may, for example, assemble the description or retrieve it from a cache.

Preference resolver 54 and policy resolver 56 each represent a combination of hardware and programming configured to conform a user interface description based upon rules. The rules can govern which objects are to be kept in a user interface description and how those objects are defined. Preference resolver 54 is responsible for conforming the user interface description so that the objects are defined consistently with user preferences. For example, user preferences may identify a user's "favorite" applications from among general applications 46. Preference resolver 54 then adapts the user interface description, if necessary, to indicate that the objects representing the user's "favorite" applications are to be positioned first in a user interface caused to be displayed from the user interface description.

Policy resolver 56 is responsible for conforming the user interface description to one or both of an application policy and a business policy. An application policy is a rule or set of rules corresponding to a given general application 46. For example, an application policy may dictate that a given general application 46 is available in a particular geographic region. Thus, if the state data included in the request received by device interface 50 indicates that device 12, 14, or 16 is located outside that region; policy resolver 56 removes the definition of the object associated with that general application 46 from the user interface description.

A business policy is a rule or set of rules that, based on business considerations, are used to conform the user interface description to define additional general applications and updates the definitions of certain objects. Business considerations include the promotion of certain general applications 46 and the recognition of the use of certain device components. For example, based on the state data included in a request, policy resolver 56 may determine that the request originated from a device 12 or 14 that is utilizing a particular component such as, in the case of a printer, an ink or toner cartridges of a given type. Based on that determination, policy resolver may update the user interface application to define an additional one of general objects 46. Policy resolver 56 may also determine that one or more general applications 46 are new and, as a result update the definitions of the objects associated with those applications. The update may, for example, cause the objects, when displayed, to include a flag or other indication that the applications are new.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Operation

Figure 5:
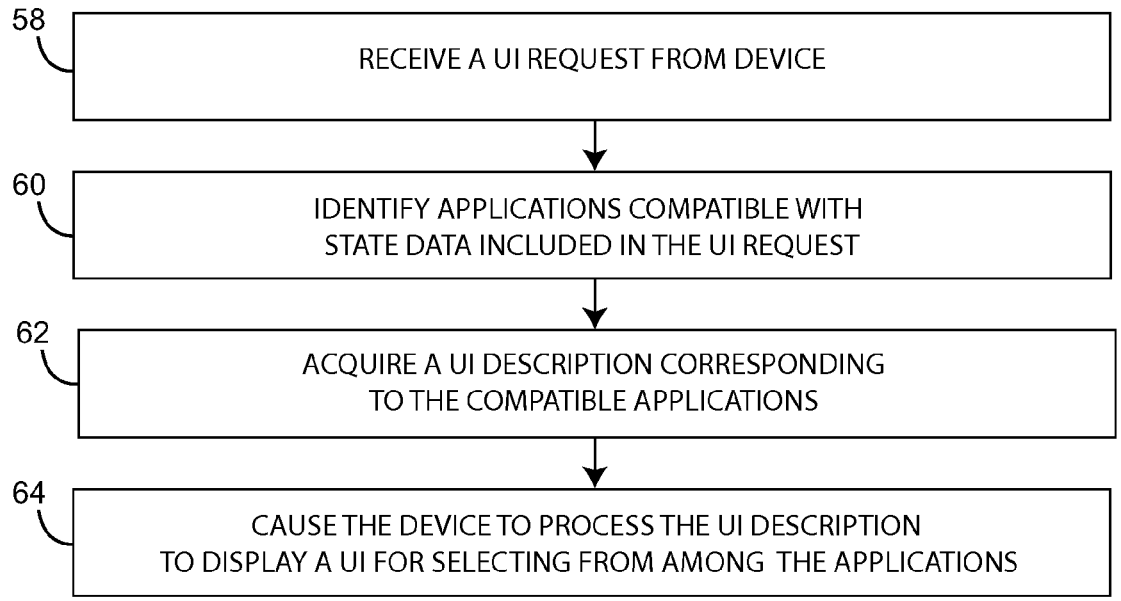
FIGS. 5-7 are exemplary flow diagrams depicting steps taken to implement various embodiments.
Figure 6:
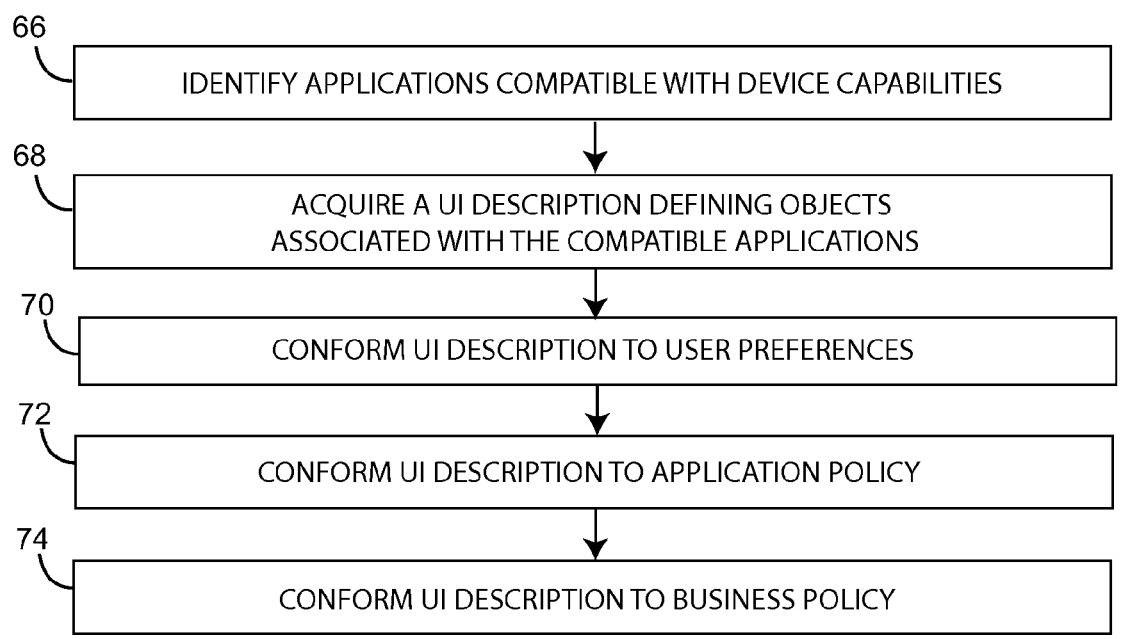
Figure 7:
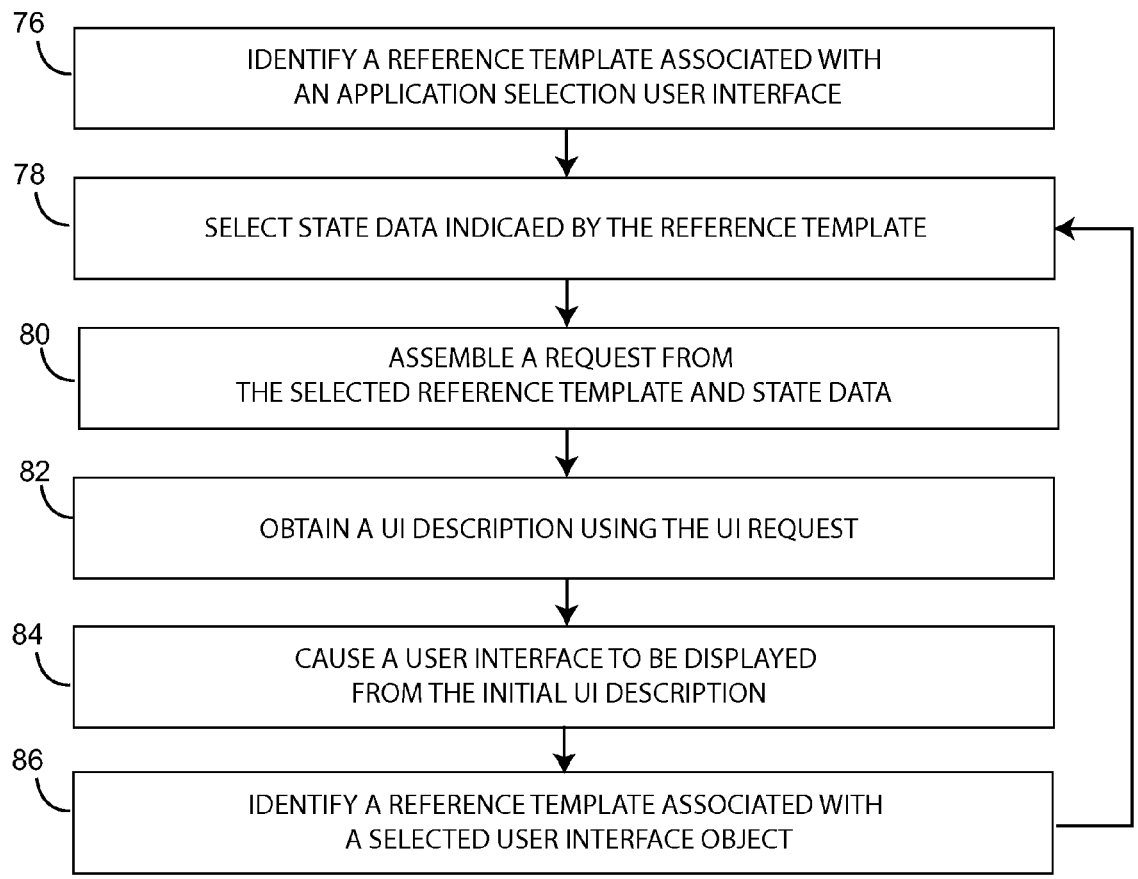

FIGS. 5-7 are exemplary flow diagrams of steps taken to implement various embodiments. In discussing FIGS. 5-6, reference may be made to component of FIGS. 1-4 to provide contextual examples. Implementation, however, is not limited to those examples. FIGS. 5 and 6 are taken from the perspective of application service 18, while FIG. 7 is taken from the perspective of device 12 or 16.

Starting with FIG. 5, a user interface (UI) request is received from a device (step 58). The UI request is a request assembled from a reference template and state data indicated by the reference template. The reference template used to generate the request is an initial reference template identified by the device that issued the request. As described, the initial reference template is a reference template for use in assembling a request for a user interface containing objects for selecting from among applications available via a network service. Referring to FIG. 4, device interface 50 may be responsible for implementing step 58.

Applications compatible with state data included in the request are identified (step 60). As noted, the request received in step 58 was assembled from the initial reference template and the state data. The state data can identify capabilities of the device that issued the request. For example, the device may or may not have an integrated touch screen. Where the device is a printer, it may or may not be capable of color printing. It may or may not have a duplex feature. So, for example, where a given application specifies a touch screen display and a duplex feature, that application will be identified as compatible in step 60 if the state data is consistent with these specifications. Referring to FIG. 4, description manager 52 may be responsible for implementing step 58.

A user interface description corresponding to the identified applications is acquired (step 62). The user interface description may be acquired by retrieval from a cache or by being assembled or otherwise generated if not available in a cache. The acquired user interface description defines a plurality of objects and position data for each object. For each object definition, the user interface description includes a reference template. One or more of the object definitions are associated with applications identified as compatible in step 60. The reference templates associated with such object definitions are to be used when generating requests of the compatible applications. To interact with a compatible application, a user interface is caused to be displayed from the user interface description. A user selects an object from the user interface associated with the application causing a request to be assembled from a reference template associated with the object. Referring to FIG. 4, description manager 52 may be responsible for implementing step 62

The device from which the request was received in step 58 is caused to process the user interface description to cause a display of a user interface for selecting from among the applications (step 64). Referring to FIG. 4, such may be accomplished by device interface 50 communicating the user interface description to device 12 or 16 where it is processed following receipt.

Moving to FIG. 6, steps 66-74 may replace steps 60 and 62 of FIG. 5. Applications compatible with device capabilities are identified (step 66). To do so, state data used to assemble a request is examined to identify the capabilities of a device. Applications that specify particular capabilities are identified as compatible if the state data reflects that the device possesses the specified capabilities. A user interface description defining objects associated with the compatible applications is acquired (step 68). The user interface description may be acquired by retrieval from a cache or by being assembled or otherwise generated if not available in a cache. Referring to FIG. 4, description manager 52 may be responsible for implementing steps 66 and 68.

The user interface description is conformed to user preferences (step 70). In doing so, the user interface description is modified, if needed, to define objects consistently with user preferences. For example, user preferences may identify a user's "favorite" applications from among a list of available applications. The user interface description is then revised to indicate that the objects representing the user's "favorite" applications are to be positioned first in a user interface caused to be displayed from the user interface description. Referring to FIG. 4, preference resolver may be responsible for implementing step 70.

The user interface description is conformed to application policy (step 72). In doing so, the user interface description is modified to define objects consistent with application policy. For example, an application policy may dictate that a given application is available in a particular geographic region. Thus, if the state data indicates that a device is located outside that region, the user interface description is revised to remove a description of an object associated with that application. Referring to FIG. 4, policy resolver may be responsible for implementing step 72.

The user interface is conformed to business policy. In doing so, the user interface description is modified to define objects consistent with business policy. For example, based on the state data included in a request, it may be determined that the request originated from a device that is utilizing a particular component such as, in the case of a printer, an ink or toner cartridges of a given type. Based on that determination, the user interface description may be updated to define an additional application as a reward for use of the component. As a further example, certain applications may be identified as new or otherwise identified as application to be promoted. The user interface description may be updated by revising the object definitions associated with those applications. The update may, for example, cause the objects, when displayed, to include a flag or other indication promoting the applications.

Moving to FIG. 7, a reference template associated with an application selection user interface is identified step (76). Referring back to FIG. 3, template engine 40 detects a user action related to causing a display of objects associated with applications available via a network service. Template engine 40 then identifies a corresponding reference template. Template engine 40 may do so by retrieving the reference template from a local memory or by retrieving it from a network service.

State data indicated by the identified reference template is then selected (step 78). As described, a reference template identifies state data. Thus, referring to FIG. 3, assembler 42 examines the identified reference template and retrieves the indicated state data. A request is assembled from the reference template and selected state data (step 80). Referring to FIG. 3, assembler 42 is responsible for step 80. An example is discussed below with respect to FIG. 8. In general, step 80 involves populating the reference template with the selected state data.

A user interface description is obtained using the request (step 82). Referring to FIG. 3, requestor 44 communicates the assembled request to application service 18, which, in turn, returns the user interface description. The user interface returned is selected or assembled based on the state data included in the request. A user interface is then caused to be displayed for the user interface description (step 84). Referring to FIG. 3, builder 32 receives and processes the user interface description causing display 28 to present the user interface.

A reference template associated with a selected user interface object is selected (step 86) and the process returns to step 78. The first pass through steps 76-84 results in the display of a user interface containing objects associated with applications available via the network service. The second pass through steps 78-86 results from a user's selection of one of those objects. Thus, the user interface caused to be displayed in step 84 on the second pass is a user interface for interacting with a selected application. The reference template associated with the selected object contains an address for accessing the selected application and identifies state data to be included in a request to that application in step 80 on the second pass. Upon receiving the request, the application returns the user interface description obtained in step 82 and used in 84 of the second pass.

On a second pass through steps 78-86 a selected user interface object may correspond to a job. As a result, on a third pass through of steps 78-86, the request assembled in step 80 is a request for a network service to communicate a job. In such cases, the job is received and processed to produce an output. Referring to FIG. 3, job engine 24 is responsible receiving and processing the job. In a given example, the job may be a print job processed to produce a printed document. Further, the job may be generated utilizing state data included in the request assembled in step 80.

As noted, the user interface description obtained in step 82 on the first pass defines a plurality of objects, each associated with a compatible application provided by a network service. Those objects may have been defined to conform to one or more of a user preference, an application policy, and a business policy FIG. 8 graphically depicts selected steps of FIG. 7 starting with identifying the reference template 88 associated with an application selection interface. Reference template 88 includes address 90, parameter IDs 92, and holes 94. Referring to FIG. 4, address 90 is an address for accessing root application 48 of application service 18. Parameter IDs 92 each identify or otherwise indicate a different piece of state data. Each hole 94 represents a position or placeholder for populating reference template 88 with state data indicated by a given parameter ID 90.

Continuing, request 96 has been assembled by populating reference template 88 with state information 98 selected from state data 38 as indicated by parameter IDs 92. Request 96 is then communicated to retrieve user interface description 100. User interface description 100 includes object definitions 102, position data 104, and reference templates 106. Object definitions 102 define the objects that are to be displayed as a part of a first user interface for selecting applications. One or more of object definitions 102 define objects associated with applications determined to be compatible with state information 98. Position data 104 defines the position of each object within the user interface. Each of reference templates 92 is associated with a different object defined by object definitions 102.

Referring to FIG. 4, description manager 52 of root application 48 assembles or selects user interface description 100 based on the state data used to populate reference template 88. In doing so, description manager 52 ensures that object definitions 102 include definitions for objects determined to be compatible based on that state data. Further, resolvers 54 and 56 may conform user interface description 100 to user preferences, application policies, and business policies.

Using interface description 100 an application selection interface is caused to be displayed. Two examples are shown in FIG. 8. The first user interface is presented on display 28. The second is presented on display 28'. Display 28 is if a smaller size than display 28'. Display 28' has touch screen capabilities, while display 28 utilizes tactile buttons 108. The user interface presented via display 28 includes objects 110 and 112 for selecting applications and objects 114 and 116 for selecting other actions. Each object has a corresponding tactile button 108. Here a user is depressing button 108 associated with object 110 in an effort to select a desired application. The user interface presented via display 28' includes objects 118-124 selecting applications and objects 114 and 116 for selecting other actions. Here a user is selecting an application associated with object 120 by touching object 120 on display 28'.

CONCLUSION

The diagrams of FIGS. 1-4 show the architecture, functionality, and operation of various embodiments. Various components illustrated in FIGS. 1-4 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 5-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus, comprising a builder, a template engine, and an assembler, wherein:
   the template engine is operable to identify a reference template associated with selection of applications provided by a network service;
   the assembler is configured to assemble a request from the identified reference template and state data indicated by the reference template; and
   the builder is configured to process a user interface description retrieved using the request to cause the display of a user interface having one or more selectable objects each associated with an application available from a network service, the applications having been selected according to the state data;
   wherein the user interface description defines a plurality of objects, each of the objects being associated with an application provided by the network service determined to be compatible with the apparatus based on the state data, the plurality of objects having been selected to conform to at least one of a user preference; an application policy; and a business policy.

2. The apparatus of claim 1, wherein the template engine is operable to identify the reference template by retrieving the reference template from the network service.

3. The apparatus of claim 1, wherein the reference template is a first reference template, the state data is first state data, the request is a first request, the user interface description is a first user interface description and the user interface is a first user interface, and wherein:
   the template engine is configured to identify a second reference template associated with a user interface object selected from the first user interface, the second reference template provided in the first user interface description;
   the assembler is configured to assemble a second request from the second reference template and state data indicated by the second reference template; and
   the builder is configured to process a second user interface description retrieved using the second request to cause the display of a second user interface.

4. The apparatus of claim 3, wherein:
   the first user interface description is provided by a first application of the network service;
   the selected user interface object is a first user interface object that is associated with a second application provided by the network service;
   the second reference template includes an address corresponding to the second application;
   the second user interface description is returned by the second application; and
   the second user interface includes second objects defined by the second user interface description for interacting with the second application.

5. The apparatus of claim 4 wherein one or more of the second objects corresponds to a job, and wherein the apparatus further comprises a job engine operable to receive and process a job to produce an output.

6. The apparatus of claim 5, wherein:
the template engine is configured to identify a third reference template associated with an object selected from the second user interface that corresponds to the job;
the assembler is configured to assemble a third request from the third reference template and state data indicated by the third reference template; and
the job engine is operable to receive and process a job delivered in as a result of the third request being communicated to the second application.

7. A non-transitory computer readable medium having instructions that when executed cause the implementation of a method, the method comprising:
identifying a reference template associated with application selection;
assembling a request from the identified reference template and state data indicated by the reference template; and
processing a user interface description retrieved using the request to cause the display of a user interface having one or more selectable objects each associated with an application available from a network service, the applications being selected according to the state data;
wherein the user interface description defines a plurality of objects, each of the objects being associated with an application provided by the network service determined to be compatible with the apparatus based on the state data, the plurality of objects having been selected to conform to at least one of a user preference; an application policy; and a business policy.

8. The medium of claim 7, wherein identifying the reference template comprises retrieving the reference template from the network service.

9. The medium of claim 7, wherein the reference template is a first reference template, the state data is first state data, the request is a first request, the user interface description is a first user interface description and the user interface is a first user interface, the method further comprising:
identifying a second reference template associated with a user interface object selected from the first user interface, the second reference template provided in the first user interface description;
assembling a second request from the second reference template and state data indicated by the second reference template; and
processing a second user interface description retrieved using the second request to cause the display of a second user interface.

10. The medium of claim 9, wherein:
the first user interface description is provided by a first application of the network service;
the selected user interface object is a first user interface object that is associated with a second application provided by the network service;
the second reference template includes an address corresponding to the second application;
the second user interface description is returned by the second application; and
the second user interface includes second objects defined by the second user interface description for interacting with the second application.

11. The medium of claim 10 wherein one or more of the second objects corresponds to a job, the method comprises receiving and processing the job to cause production of an output.

12. The medium of claim 10, wherein the method comprises:
identifying a third reference template associated with an object selected from the second user interface that corresponds to a job;
assembling a third request from the third reference template and state data indicated by the third reference template; and
receiving and processing a job delivered as a result of the third request being communicated to the second application.

13. A system comprising a description manager, a capabilities resolver, and a device interface, wherein:
the device interface is configured to receive a request assembled by a device from a first reference template and state data indicated by the first reference template;
the capabilities resolver is configured to identify applications from a plurality of applications that are compatible with the state data;
the description manager is configured to acquire a user interface description defining a plurality of objects and a plurality of reference templates, each reference template being associated with a different one of the objects and each object associated with a difference one of the identified applications; and
the device interface is configured to cause the device to process the user interface description to display a user interface having the defined objects;
wherein the description manager is configured to acquire the user interface description by retrieving the user interface description from a cache or assembling the user interface description if not available in the cache.

14. The system of claim 13, further comprising a preference resolver configured to conform the acquired user interface description to preference data of a user responsible for the request.

15. The system of claim 13, further comprising a policy resolver configured to conform the acquired user interface description to one of a business policy and an application policy associated with one or more of the plurality of applications.

16. The system of claim 13, further comprising preference resolver and an application resolver, wherein:
the preference resolver is configured to conform the acquired user interface description to preference data of a user responsible for the request;
the policy resolver is configured to conform the acquired user interface description to one of a business policy and an application policy associated with one or more of the plurality of applications; and
wherein conforming the acquired user interface description includes one or more of, selecting a presentation order of the defined objects, modifying one or more of the defined objects, and excluding one or more of the defined objects.

17. The system of claim 13, wherein the device is a printer and one or more of the identified applications are print applications.

* * * * *